United States Patent [19]
Klemba et al.

[11] Patent Number: 5,651,068
[45] Date of Patent: Jul. 22, 1997

[54] INTERNATIONAL CRYPTOGRAPHY FRAMEWORK

[75] Inventors: Keith S. Klemba, Santa Clara, Calif.; Roger Merckling, Gieres, France

[73] Assignee: Hewlett-Packard Company, Palo Alto, Calif.

[21] Appl. No.: 401,588

[22] Filed: Mar. 8, 1995

[51] Int. Cl.$^6$ ..................................................... H04K 1/00
[52] U.S. Cl. .................................. 380/25; 380/4; 380/52; 235/380
[58] Field of Search ..................................... 380/23, 25, 4, 380/52; 235/380

[56] References Cited

U.S. PATENT DOCUMENTS 5,164,988  11/1992  Matyas et al. ............................ 380/25

OTHER PUBLICATIONS

Dorothy E. Denning, et al., "Key Escrowing Today" article, 09/1994, vol. 32, No. 9, IEEE Communications Magazine, pp. 58–68.

Ronald Ferreira, TRT,CTI Philips France, "The Practical Application of State of the Art Security in Real Environments" article, pp. 334–355.

*Primary Examiner*—David C. Cain

[57] ABSTRACT

A cryptographic framework consists of four basic service elements that include a national flag card, a cryptographic unit, a host system, and a network security server. Three of the four service elements have a fundamentally hierarchical relationship. The National Flag Card (NFC) is installed into the Cryptographic Unit (CU) which, in turn, is installed into a Host System (HS). Cryptographic functions on the Host System cannot be executed without a Cryptographic Unit, which itself requires the presence of a valid National Flag Card before it's services are available. The fourth service element, a Network Security Server (NSS), can provide a range of different security services including verification of the other three service elements. The framework addresses national policies governing cryptography, where such policies can be independently developed and maintained using a such a framework. Furthermore, the common service elements provide the necessary focus for establishing interoperability while reconciling these different National policies.

25 Claims, 3 Drawing Sheets

INTERNATIONAL CRYPTOGRAPHY FRAMEWORK

BACKGROUND OF THE INVENTION

1. Technical Field

The invention relates to cryptography. More particularly, the invention relates to an international cryptography framework.

2. Description of the Prior Art

Customers of large computer systems are typically multinational corporations that want to purchase enterprise wide computer based solutions. The distributed nature of such organizations requires them to use public international communications services to transport data throughout their organization. Naturally, they are concerned about the security of their communications and seek to use modern end-to-end cryptographic facilities to assure privacy and data integrity.

The use of cryptography in communications is governed by national policy and unfortunately, national policies differ with respect to such use. Each national policy is developed independently, generally with a more national emphasis rather than international considerations. There are standards groups that are seeking to develop a common cryptographic algorithm suitable for international cryptography. However, the issue of international cryptographic standards is not a technical problem, but rather it is a political issue that has national sovereignty at its heart. As such, it is not realistic to expect the different national cryptography policies to come into alignment by a technical standardization process.

The issue of national interests in cryptography is a particular concern of companies that manufacture open-standards-based information technology products for a worldwide market. The market expects these products to be secure. Yet, more and more consumers of these products are themselves multinational and look to the manufacturers to help them resolve the international cryptography issues inhibiting their worldwide information technology development. The persistence of unresolved differences and export restrictions in national cryptography policies has an adverse impact on international market growth for secure open computing products. Thus, it would be helpful to provide an international framework that provides global information technology products featuring common security elements, while respecting the independent development of national cryptography policies.

Nations have reasons for adopting policies that govern cryptography. Often these reasons have to do with law enforcement and national security issues. Within each country there can be debates between the government and the people as to the rightness and acceptability of these policies. Rather than engage in these debates or try to forecast their outcome, it is more practical to accept the sovereign right of each nation to establish an independent policy governing cryptography in communication.

Policies governing national cryptography not only express the will of the people and government, but also embrace certain technologies that facilitate cryptography. Technology choice is certainly one area where standardization can play a role. However, as indicated earlier this is not solely a technical problem, such that selection of common cryptographic technologies alone can not resolve the national policy differences. Consequently, it would be useful to provide a common, accepted cryptography framework, wherein independent technology and policy choices can be made in a way that still enables international cryptographic communications consistent with these policies.

SUMMARY OF THE INVENTION

The invention provides a four-part technology framework that supports international cryptography, which includes a national flag card, a cryptographic unit, a host system, and a network security server. Three of the four service elements have a fundamentally hierarchical relationship. The National Flag Card (NFC) is installed into the Cryptographic Unit (CU) which, in turn, is installed into a Host System (HS). Cryptographic functions on the Host System cannot be executed without a Cryptographic Unit, which itself requires the presence of a valid National Flag Card before it's services are available. The fourth service element, a Network Security Server (NSS), can provide a range of different security services including verification of the other three service elements.

The framework supports the design, implementation, and operational elements of any and all national policies, while unifying the design, development, and operation of independent national security policies. The invention thus gives standard form to the service elements of national security policies, where such service elements include such things as hardware form factors, communication protocols, and on-line and off-line data definitions.

DETAILED DESCRIPTION OF THE INVENTION

National cryptography policy often varies by industry segment, political climate, and/or message function. This makes it difficult to assign one uniform policy across all industries for all time, consequently, the flexibility of a cryptography framework that incorporates a national flag card is very attractive. The invention is therefore directed to resolving problems surrounding international cryptography. It presents a framework that may be used to support the design and development of any national policy regarding cryptography.

Figure 1:
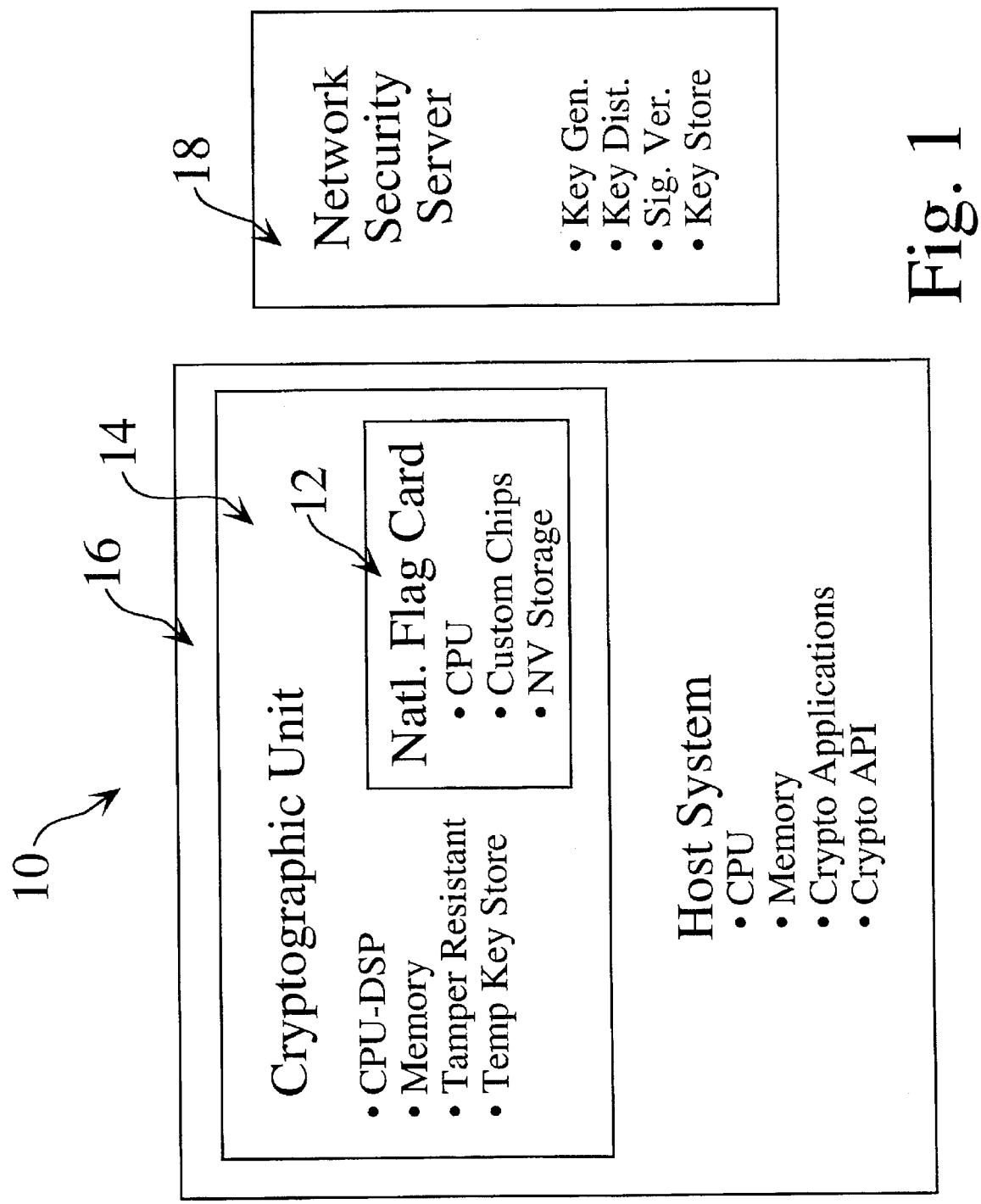
FIG. 1 is a block diagram of an international cryptography framework, including a national flag card, a cryptographic unit, a host system, and a network security server according to the invention.

The invention provides an international cryptography framework that has four service elements, each offering different types of services. FIG. 1 is a block diagram of the international cryptography framework 10, including a national flag card 12, a cryptographic unit 14, a host system 16, and a network security server 18. Three of the four service elements have a fundamentally hierarchical relationship. The National Flag Card (NFC) is installed into the Cryptographic Unit (CU) which, in turn, is installed into a Host System (HS). Cryptographic functions on the Host System cannot be executed without a Cryptographic Unit, which itself requires the presence of a valid National Flag Card before it's services are available. The fourth service element, a Network Security Server (NSS), provides a range of different security services including verification of the other three service elements, and thus acts as a trusted third party.

Messages encrypted using the proposed framework carry an electronic stamp identifying the National cryptography policy under which the message was encrypted. The Network Security Server also provides stamp verification services for message handling systems.

Figure 2:
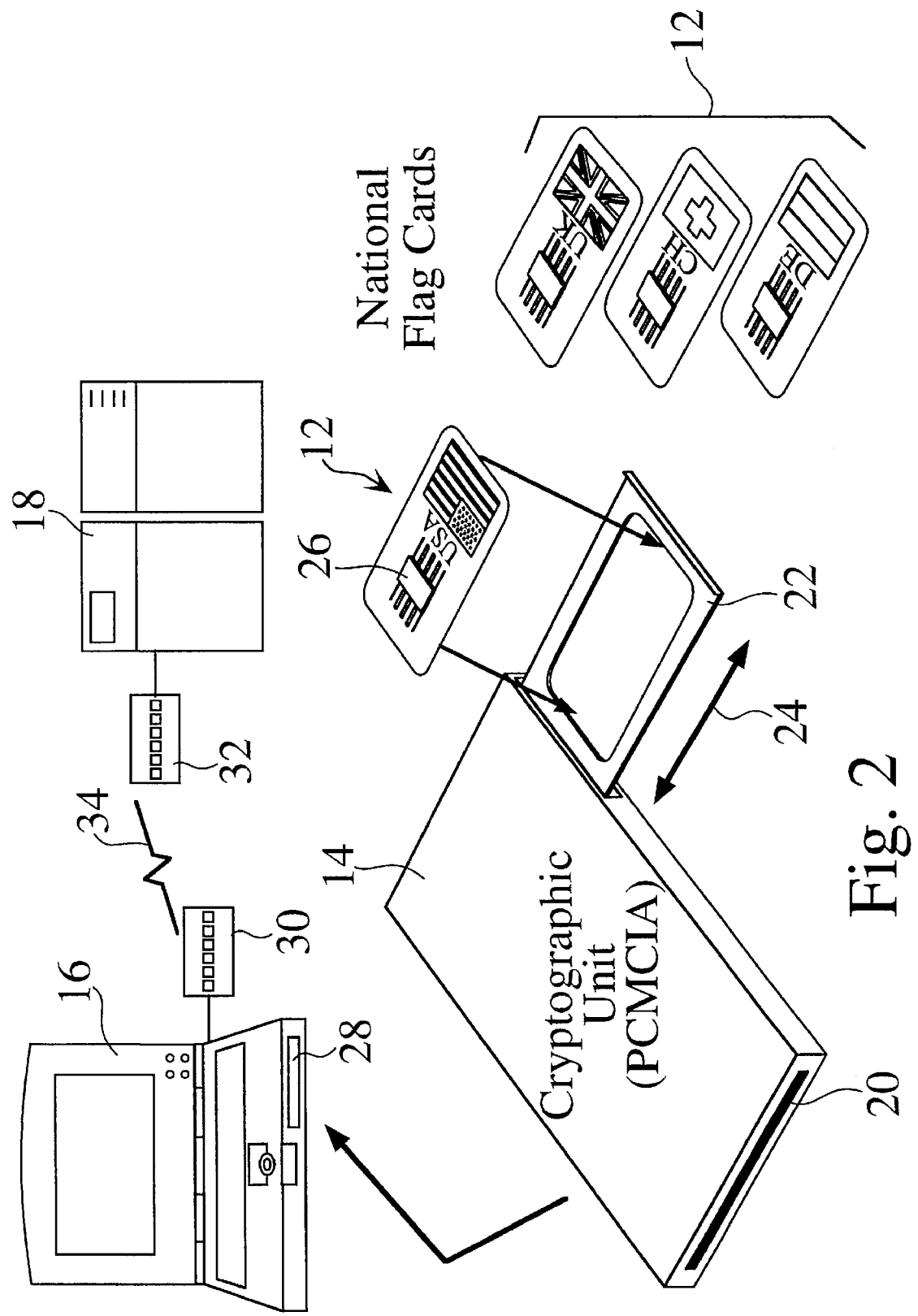
FIG. 2 is a perspective view showing the four basic elements of the framework, including a cryptographic unit and several national flag cards, a host system, and a national security server according to the invention.

FIG. 2 is a perspective view showing the four basic elements of the framework, including the cryptographic unit 14 and several national flag cards 12, a host system 16, and a national security server 18. In the following sections each service element is discussed in greater detail, followed by a series of examples to illustrate the interworking of the four service elements in various embodiments of the invention.

NATIONAL FLAG CARD (NFC). The NFC 12 is a small stamp sized (25×15 mm) ISO 7816-type smart card, i.e. a one chip computer 26 having a non-volatile memory. The NFC is mounted on a rigid substrate and sealed in a tamper-proof package. The NFC is typically produced independently and distributed by National agencies (e.g. United States Postal Service, German Bundespost). National agencies may also license NFC production and distribution to private industry.

The action of the NFC service element is to enforce a Nation's policy governing the use of cryptography. An NFC is a complete computer that can be constructed as a multi-chip architecture to include custom integrated circuits. It also would include tamper resistance and unique identification features, making unauthorized entry or duplication impossible. For example, the NFC could be sealed in such a way that opening its package would destroy any integrated circuit or data inside. The NFC could require receipt of an encrypted authorization issued by the National Security Server. All services of the NFC are provided via standard ISO 7816 message exchanged protocol between the NFC and other service elements. This format is identical to the smart card used in Europe to support GSM in cellular voice services.

CRYPTOGRAPHIC UNIT (CU). The CU is a tamper-resistant hardware component designed to provide protected cryptographic services under the strict control of an NFC. CUs would be produced competitively by system vendors and third parties and be free of import and export restrictions. Because the CU includes critical elements of security such as encryption algorithms and keys, it is likely that it would be certified (e.g. NIST, NCSC, or ITSEC Certified) for customer assurance. It is a feature of this invention that the CU does not contain any governing policy other than its dependence upon a NFC. This component is preferably designed for performance and protection with customization for a given Host System.

The CU may be offered in various formats, for example as a PCMCIA card having a connector 20 that is adapted to mate with a corresponding connector in the PCMCIA slot 28 of a Host System, such as a personal computer. One preferred PCMCIA format is the GEMPLUS Smart PC Card, which includes a small drawer 22 that extends from the PCMCIA card, as indicated in FIG. 2 by the arrow 24, to support the stamp-sized NFC. Other CU formats might include custom ASIC, daughter boards, EISA boards, or motherboard logic. It is also possible for the framework to embrace a software-only CU running on the HS. However, software's current state of the art finds it very difficult to provide protection for keys, algorithms, and enabling/disabling control. This is possible only when the HS is a very closed system, for example with ROM only applications. Even then it would be difficult to control software replication without these constraints.

The CU preferably contains popular cryptographic algorithms, such as DES and RSA. However, these algorithms would not be enabled without the presence of a valid NFC. This is a variation of the cryptography with a hole concept with a very controlled methodology and framework for filling the hole.

Although cryptographic techniques are not discussed in detail herein, there are more than a few solution methodologies available. For example, the cryptographic communications system described in U.S. Pat. No. 4,405,829, commonly referred to as the RSA (i.e. Rivest, Shamir, Adelman) cryptosystem, may be used in connection with the invention herein. In such a system, a public key P is made available for encryption of messages M, while an associated secret key S is kept secret. The secret key is required for decryption of messages.

In the RSA cryptosystem, the public key is a pair of integers P=(n, e), and the secret key is also a pair of integers S=(n, d). The public key and secret key are created in an RSA cryptosystem as follows:
1. Two prime numbers p and q are chosen.
2. The integer n used in the public and secret keys is given by n=pq.
3. The constant phi(n) is calculated according to the equation phi(n)=(p−1)(q−1).
4. The integer used in the public key e is chosen to be an odd integer relatively prime to phi(n).
5. A value for d is calculated which is the multiplicative inverse of e modulo phi(n).
6. Each message to be encrypted is denoted by a number M in the range $0 \leq M \leq n$.
7. The encrypted message is denoted by the number C, also in the range $0 \leq M \leq n$, where $C=M^e (\mod n)$.
8. The secret key S=(n, d) is used to decrypt the ciphertext C because $M=C^d (\mod n)$.

The RSA cryptosystem is secure because there is no easy way to calculate the secret key S=(n, d) from the public key P=(n, e). The easiest known way to determine d from n and e is to factor n. The security of the RSA cryptosystem rests in large part on the difficulty of factoring large integers. That is, the RSA public key cryptosystem is based on the dramatic difference between the ease of finding large prime numbers, and the difficulty of factoring the product of two large prime numbers. Thus, in the '829 patent it is stated that "the security of the system is dependent upon the ability to determine p and q which are the prime factors of n. By selecting p and q to be large primes, the resultant composite number n is also large, and correspondingly difficult to factor. For example, using known computer-implemented factorization methods, on the order of $10^9$ years is (sic) required to factor a 200 digit long number."

See also, for example T. Cormen, C. Leiserson, R. Rivest, *Introduction to Algorithms*, MIT Press/McGraw-Hill Book Co., 1991, pg. 831–837, 851–852, 995, and S. Garfinkel, *PGP Pretty Good Privacy*, O'Reilly & Associates, Inc. 1995, pg. 33–59, 355–367.

Because there are likely to be other verification issues surrounding each service element, it is preferred that the choice of encryption technique be resolved for each application to which the invention is put. Additionally, the NFC and CU may be provided in various form factors. For example, a product may be built in a larger package that allow it to provide more performance, i.e. greater security.

HOST SYSTEM (HS). The HS is identifiable as the hardware component that delivers secure information technology services directly to the user. HSs are typically a general purpose information technology device and would be produced competitively in a wide open market. Examples include personal digital assistants, personal computers, workstations, laptops, palmtops, networked servers, main frames, network printers, or video display units. The function of the HS service element in the framework is to provide an Application Programming Interface (API) for accessing the CU service element. Preferably, CU support is provided as an option available on the HS.

The HS represents a very large and diverse class of information technology equipment. Although these systems are initially grouped uniformly into a common class, some applications might prefer to break this class down into specialized subclasses (e.g. Telecommunications, Banking, Trading). The framework allows for this and supports it by allowing different types of NFCs to be used to identify these different HS subclasses.

NETWORK SECURITY SERVER (NSS). The NSS is a network node designed and designated to provide trusted third party security services. For example, any network access, such as via modems 30, 32 over a network 34, must be authenticated by the NSS. In the context of national security, NSSs are preferably developed, owned, and operated by government agencies. Some of the functions provided by the NSS service element include service element authentication, message stamp authentication, national policy enforcement, and cryptographic key distribution. The importance of the NSS can rise sharply in environments where a strong degree of verification is prerequisite to cryptographic use. The NSS also plays a significant role in the interoperability of differing National cryptographic policies.

SCOPE OF THE FRAMEWORK. The scope of the framework is largely defined by the scope of the NFCs. The basic scope of the NFCs is that of a domain. A domain can be as large as worldwide and as small as a business unit. At the domain level there is no unique distinction among its members. While this framework primarily focuses on National and International domains (e.g. France, Germany, United States, United Kingdom, European Commission, NATO, North America, G7) other domains or sub-domains are also considered. For example, industry domains (e.g. Telecom, Healthcare, Financial Services, Travel), corporate domains (e.g. Hewlett-Packard, Ford Motor Company, CitiBank), association domains (e.g. IEEE, ISO, X/Open), service domains (e.g. Compuserve, America On-Line), and product domains (e.g. Lotus, Microsoft, General Motors, Proctor & Gamble).

Beyond domains and subdomains the scope of the framework can optionally be expanded to define uniqueness within a domain. Again it is the NFCs that make this narrower scope possible. Providing uniqueness means allowing for the transfer of unique or personal data to be transferred to the NFC either at the time of purchase or at the point of initial validation. NFCs are considered anonymous when dealing at the domain level. When uniqueness is added, NFCs are no longer anonymous.

INTERCONNECT OF FRAMEWORK ELEMENTS. The interconnection of service elements (e.g. NFC, CU, HS, NSS) of this framework is accomplished by the adoption of standard Application Programming Interfaces (e.g. X/Open, OSF) and industry standard protocol exchanges (e.g. TCP/IP, ISO, DCE, X.509). The interconnection of elements may be synchronous (i.e. on-line), asynchronous (i.e. off-line), local (e.g. runtime library), remote (e.g. RPC) or any combination of these. For example, a policy that involves personalization of NFCs could perform a one time authorization function via a NSS making it unnecessary for future on-line verification with an NSS until the NFC expires.

Figure 3:
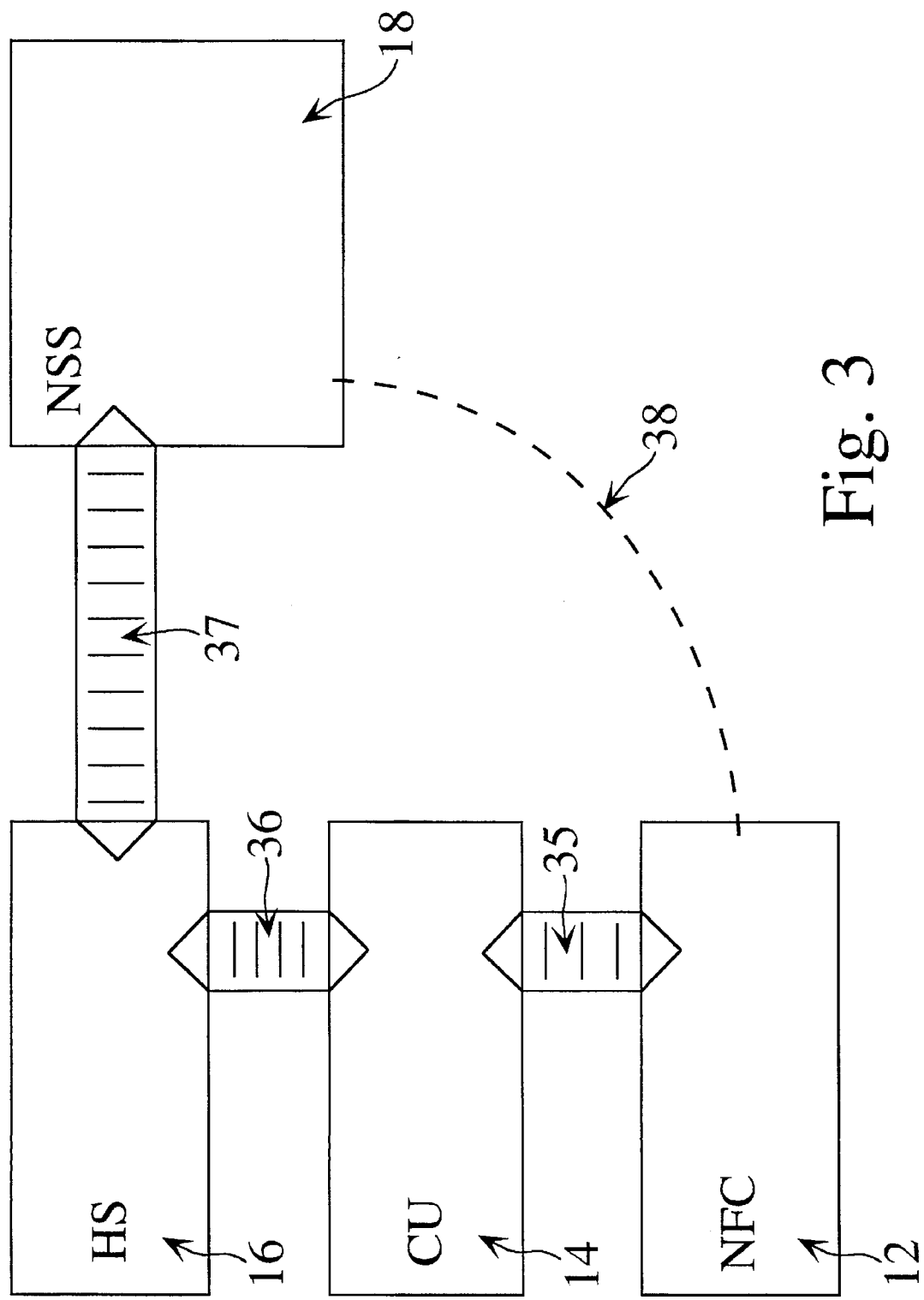
FIG. 3 illustrates the message exchange paths, between an NFC and a CU, between a CU and an HS, and between an HS and an NSS.

Beyond the physical interconnection of the framework's service elements lies the message exchange between the elements and the actual services provided and requested via this message exchange. FIG. 3 illustrates the message exchange paths, between an NFC 12 and a CU 14 (path 35), between the CU 14 and an HS 16 (path 36), and between the HS 16 and an NSS 18 (path 37). A virtual connection 38 exists between the NFC and the NSS. Messaging protocol between the HS and the CU along the path 36 are best taken from crypto API standardization efforts (e.g. NSAs Crypto API, Microsoft's Crypto API). The messaging protocol between the CU and the NFC along the path 35 is categorized into two groups: initialization protocols, and operational protocols. The initialization protocols must be successful before operational protocols are active.

The CU<->NFC initialization messaging along the path 35 can be initiated by either the CU 14 or the NFC 12.
100 CU>NFC Begin initialization sequence
101 NFC>CU Begin initialization sequence
102 CU>NFC Identification information?
103 NFC>CU NFC Identification credentials, one for each policy supported
104 CU>NFC Policy # activation?
105 NFC>CU Policy # activation status={in progress}
106 CU>NFC Policy # activation?
107 NFC>CU Policy # activation status={completed}
108 CU>NFC Algorithm # enabler?for 109 opt NFC>CU NSS Authorization for Algorithm #? (Encrypted)
110 opt CU>HS NSS Authorization for Algorithm #? (Encrypted)
111 opt HS>NSS NSS Authorization for Algorithm #? (Encrypted)
112 opt NSS>HS Algorithm # enabler code (Encrypted)
113 opt HS>CU Algorithm # enabler code (Encrypted)
114 opt CU>NFC Algorithm # enabler code (Encrypted) for
115 NFC>CU Algorithm # enabler code
116 CU>NFC Algorithm # enabled
117 CU>NFC Algorithm seed key
118 NFC>CU Algorithm seed key
119 opt CU>HS Algorithm # readied by Policy #

The CU<->NFC operation messaging along the path 35 provides a number of services.
201 CU>NFC Perform Alg # phase # on {data}
202 NFC>CU Alg # phase # {complete} {data}
203 CU>NFC Status Request for 204 NFC>CU Policy # active, Alg # {enabled}, Alg # {busy}

APPLICATION OF THE FRAMEWORK. The invention has various applications. In particular, the framework is ideally suited for various national security schemes and operates consistently across a variety of local laws. For example the framework could be used to support a key escrow policy. Key escrowing is a process where the keys or family keys used for cryptography are kept by a third party, in the national context, typically a government agency. This allows the third party to decrypt information when, for example, a law enforcement agency is required to see the contents of an encrypted message.

For example if the policy of nation-X requires key escrow, then when nation-X NFC's are put into circulation they contain a key escrowed by nation-X. Law enforcement would be able to use the electronic stamp on a message to determine that the message was encrypted under the policy of nation-X. It would also be able to determine unique identification information of the specific NFC used to enable the CU. If nation-X agrees to cooperate, the escrowed key for the NFC involved may be obtained to decrypt the suspicious message.

The actual encryption algorithm used in nation-X may be the same encryption algorithm that is used in nation-Z, such that when a user from nation-X visits nation-Z it is only necessary to put a NFC from nation-Z into the CU. The encryption algorithm in the CU remains the same, but what is governing the use of cryptography is the policy of nation-Z. For example, the policy of nation-Z may require a trap door, such that the government of nation-Z is able to take a back door into the users system to read the deciphered text. In this case the nation-Z NFC provides a back door rather than an escrowed key to Law enforcement. Several such schemes are known in the art and it is a feature of the invention that the framework is readily adapted to accommodate all such schemes as may be implemented in a particular National policy without affecting the basic hardware, software, or data structures of a user system, with the exception of the NFC.

Thus, the encryption algorithms in CU may be the same encryption algorithms used everywhere. The NFCs control the use of these encryption algorithms in accordance with the local law. Because the NSS is a trusted third party that validates proper local use of the framework, it is not possible to use cryptography unless a locally accepted NFC is installed in the CU. In the example above, even though the encryption engine operates properly in nation-X, It would not operate in nation-Z unless the NFC was replaced with a nation-Z's NFC. For international communication of encrypted information, (e.g. where an encrypted message is generated in nation-Z and sent to nation-X. The involvement of cryptography for such messages will be independently controlled by two NFCs—the X flag card in nation-X and the Z flag card in nation-Z. The invention therefore offers the ability to support government policy, whatever that policy may be, and still provide uniform cryptographic services.

In addition to the nationalization issues that are illustrated above, within a certain nation there may be multiple encryption policies (e.g. nation-X might have a policy for banking that is more liberal than its policy for manufacturing). Accordingly, the framework is adapted to operate within each country under several different national policies, or with several different levels of encryption. For example, just as there are different stamps for first class and priority mail, the framework may allow for different levels of encryption based on the type of the NFC installed.

It is a feature of the framework that CUs may have the major standard encryption algorithms built-in (e.g. DES, RSA, DSS, MD5). However, it is also possible to install custom algorithms into the CU providing that the policy in the governing NFC permits this type of activity. Software algorithms can be transferred completely or partially into the CU from either the NFC or the NSS. Hardware algorithms can be added to the CU via the NFC. The actual encryption of a message may involve the NFC, CU, or NSS, or any combination thereof. As soon as the NFC is removed from the CU these custom algorithms are no longer operation, perhaps not even present, in the CU.

Another application of the framework involves the metering of network access. For example, the so-called "Information Highway" may end up to be a toll road. In such tarrifed implementations the NFC could provide the ticket that must be present to allow communication within the network infrastructure. Thus, one might purchase an NFC that allows a predetermined number of messages to be sent over the network. This scheme may be viewed as a form of taxation that helps to pay for the network infrastructure if the network is publicly owned, and as a fee if the network is privately owned.

Another use for the framework is in avoidance of software piracy. For example, an NFC may be packaged with the software when one buys a software product (e.g. integrated into the packages as part of the software manual). To use the product, one removes the NFC from the manual, puts it in a CU or HS, and may then perform a one-time load (or limited number of loads) of the software onto a system. The framework may also be used to protect software because the software is encrypted and may only be decrypted when an NFC that is specific to the software or software manufacturer is present in the CU.

The framework is especially applicable where a trust factor is required between the users site and a networked server. No matter how unreliable intervening systems might be, the NFC and NSS are always able to maintain integrity through the communication channel. This is possible because the NFC is a tamper-proof piece of hardware that cannot be duplicated outside of the factory that manufactured it and the NSS is in a strictly supervised environment. It is possible to build upon this NFC/NSS trust model, to expand the strength of other session bindings.

Another application of the framework involves the use of challenge response protocols to validate combinations of the framework service elements. For example, before the NFC begins accessing the NSS for authentication/verification, the NFC itself will check out whether it is installed properly and if it finds the CU-HS pair to be valid. This would be useful in allowing only certain systems to use a class of NFCs.

Another application for which the framework is well suited is in connection with an entertainment subscription service. The framework is well suited in this environment for the application of renewable cryptography to provide a fast technique for updating system security on a regular basis, such that a new usage policy or new encryption algorithm can be implemented before there is enough time to reverse engineer the old method. This approach keeps the security system one step ahead of pirating. For example, a subscriber is provided with a personalized NFC with each month's statement that allows use of a descrambler for one month. The subscription service may also include some additional NFCs of a promotional value (e.g. an NFC that provides one free hour access to a movie channel).

OPERATING SCENARIO—USERS PERSPECTIVE. Tom is a buyer in the U.S. working for Slam International Inc. He has purchased a Hewlett-Packard palmtop [HS] with which he intends to send quotation and delivery information directly to manufacturing sites worldwide. He will also use the palmtop to access backlog information directly from regional sales centers while negotiating with customers. Tom's business if very competitive and all this information is considered, shod term, very sensitive. Tom purchased a cryptographic option [CU] with his palmtop so he can encrypt and decrypt his messages. However, to activate this capability he must install a United States Class V Smart Stamp [NFC] which he can purchase at a U.S. Post office. Tom's HS-CU-NFC combination is now verified by a FCC-operated Network Authenticator [NSS] in Denver via a local GTE cellular service. Tom uses Lotus-Notes on his palmtop to send and receive his messages. Lotus-Notes encrypts Tom's messages prior to transmission and decrypts the messages after receipt. After 30 days the Class V Smart Stamp in Tom's palmtop expires and so too does Tom's ability to encrypt and decrypt messages until he purchases a new Smart Stamp.

Every now and then Tom has to leave the U.S. to visit manufacturing facilities around the world. Tom is able to take his palmtop in and out of the U.S. with the validated HS-CU-NFC intact. Use of the U.S. policy in non-U.S. countries would, however, depend on the political relationship between that country and the U.S. Public carriers transporting messages have the option to accept or deny traffic encrypted using another countries cryptographic policy. The electronic stamp provided by the NFC insures that message carriers are able to identify the national policy used to encrypt the message.

OPERATING SCENARIO—GOVERNMENT PERSPECTIVE. Bill is a government agent investigation trafficking of contraband, and Tom (from User Perspective above) has come under suspicion. After considerable investigation, agent Bill suspects that salesman Tom is using his palmtop for more than legitimate business and seeks a court order to investigate further. Subsequently, salesman Tom's messages are recorded of the public carrier facilities. The messages carry an electronic stamp identifying the cryptographic policy used to encrypt the message. Having been encrypted using a United States Class V Smart Stamp, the U.S. government, after due process, is able to provide agent Bill the keys necessary to decrypt salesman Tom's messages for analysis. One additional element of evidence also exists that links Tom's palmtops to the source of the messages. Because each NFC and its electronic stamp is unique, the HS-CU-NFC combination verified by the government run NSS ties Tom's messages uniquely to the NFC in that verified combination.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A cryptographic function for an international cryptography framework that includes a cryptographic unit, said cryptographic function comprising:

a national flag card for accommodating at least one defining parameter of a cryptographic scheme as required by a particular national policy without affecting user system hardware, software, or data structures beyond anticipated adaptation;

said cryptographic unit requiring the presence of said national flag card to execute said cryptographic function.

2. The framework of claim 1, further comprising:

a cryptographic unit including a cryptography engine, said cryptographic unit adapted to implement said cryptographic scheme if and only if said cryptographic unit is used in combination with a valid national flag card.

3. The framework of claim 2, further comprising:

a host system adapted to implement an information technology application, said host system arranged for communication with said cryptographic unit and adapted to implement said cryptographic scheme if and only if said host system is used in combination with a cryptographic unit and a valid national flag card.

4. The framework of claim 1, further comprising:

a network security server adapted to provide trusted third party services including any of authentication, digital signature verification, digital authorization certificate generation, and authentication of said national flag card prior to allowing implementation of said cryptographic scheme.

5. The framework of claim 4, wherein said national flag card incorporates an electronic stamp that identifies a particular national policy; and wherein said network security server is a network node that verifies said stamp for message handling processes within said network prior to allowing implementation of said cryptographic scheme.

6. The framework of claim 4, wherein said network security server is adapted to distribute a cryptography key to said national flag card.

7. The framework of claim 1, wherein said national flag card includes user personalization information in each message generated using said cryptographic scheme.

8. A cryptographic framework for providing uniform cryptography that operates consistently and in conformance with diverse national policies, comprising:

a national flag card for accommodating a cryptographic scheme as required by a particular national policy without affecting user system hardware, software, or data structures;

a cryptographic unit including a cryptography engine, a cryptographic unit adapted to implement said cryptographic scheme; and a host system for implementing an information technology application, wherein said host system is in communication with said cryptographic unit via an application programming interface, and wherein said national flag card is installed into said cryptographic unit which, in turn, is installed into said host system, such that cryptographic functions on said host system cannot be executed without a cryptographic unit, which in turn requires the presence of a valid national flag card.

9. The framework of claim 8, further comprising:

a network security server adapted to provide trusted third party security services, including verification of any of said national flag card, said cryptographic unit, and said host system.

10. The framework of claim 9, wherein said national flag card incorporates an electronic stamp that identifies a particular national policy; and wherein said network security server is a network node that verifies said stamp for message handling processes within said network prior to allowing implementation of said cryptographic scheme.

11. The framework of claim 9, wherein said network security server is adapted to distribute a cryptography key to said national flag card.

12. The framework of claim 8, wherein said national flag card includes user personalization information in each message generated using said cryptographic scheme.

13. The framework of claim 8, wherein said cryptographic unit is a self-contained PCMCIA card-like unit.

14. The framework of claim 8, wherein said national flag card is a tamper-resistant smart card.

15. The framework of claim 14, wherein said cryptographic unit is adapted to receive and secure said national flag card therein.

16. The framework of claim 13, wherein said host unit is adapted to receive and secure said cryptographic unit therein.

17. The framework of claim 8, wherein said cryptographic unit implements a generic encryption engine; and wherein said national flag card is adapted to assure that said generic cryptographic engine and the use thereof comply with national cryptographic policy of the country in which said framework is used.

18. The framework of claim 17, wherein said national flag card is adapted to selectively implement at least one additional cryptographic engine in combination with said cryptographic unit.

19. A cryptography framework, comprising:

a flag card for accommodating a cryptographic scheme as required by a particular application without affecting user system hardware, software or data structures;

a cryptographic unit including a cryptography engine, said cryptographic unit adapted to implement said cryptographic scheme if and only if said cryptographic is used in combination with a valid flag card; and a host system for implementing an information technology application, said host system arranged for communication with said cryptographic unit and adapted to implement said cryptographic scheme if and only if said host system is used with combination with a cryptographic unit and a valid flag card;

wherein said flag card implements a selected cryptographic standard.

20. The framework of claim 19, further comprising:

a network security server adapted to provide trusted third party authentication of said flag card prior to allowing implementation of said cryptographic scheme.

21. The framework of claim 19, wherein said selected cryptographic standard may comprise any of a selected cryptography algorithm, a selected level of cryptography, a national policy, information personalization, system and network access metering, and renewable cryptography.

22. A method for providing uniform cryptography that operates consistently and in conformance with diverse national policies, comprising the steps of:

providing a national flag card for accommodating a cryptographic scheme as required by a particular national policy without affecting user system hardware, software, or data structures;

operating said national flag card in combination with a cryptographic unit including a cryptography engine, said cryptographic unit implementing said cryptographic scheme; and implementing an information technology application with said host system in communication with said cryptographic unit via an application programming interface.

23. The method of claim 22, further comprising the steps of:

installing said national flag card into said cryptographic unit;

installing said cryptographic unit into said host system, such that cryptographic functions on said host system cannot be executed without a cryptographic unit, which in turn requires the presence of a valid national flag card.

24. The method of claim 22, further comprising the step of:

providing a network security server adapted to provide trusted third party security services, including verification of any of said national flag card, said cryptographic unit, and said host system.

25. The method of claim 22, further comprising the steps of:

incorporating an electronic stamp into said national flag card that identifies a particular national policy; and verifying said stamp for message handling processes within said network prior to allowing implementation of said cryptographic scheme with said network security server.

* * * * *